June 3, 1941.   H. A. BANNER   2,244,600
FASTENER FOR SKID CHAINS
Filed Aug. 28, 1940

Inventor
Harlan A. Banner

By Clarence A. O'Brien

Attorney

Patented June 3, 1941

2,244,600

UNITED STATES PATENT OFFICE 2,244,600

FASTENER FOR SKID CHAINS

Harlan A. Banner, Canonsburg, Pa.

Application August 28, 1940, Serial No. 354,606

3 Claims. (Cl. 24—116)

This invention relates to fasteners for motor vehicle tire chains, and has for the primary object the provision of a quick detachable fastener to be employed for releasably securing cross chains to the side chains of a non-skid tire chain of a conventional construction whereby when it is necessary to replace a cross chain due to breaking or wearing to the extent that its usefulness for the purpose intended therefor is void, the defective cross chain may be easily removed and replaced by another without the use of a specially constructed tool, the device being so constructed that the change of the cross chains may be easily and quickly brought about by a person with a minimum amount of effort.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which—

Figure 1:
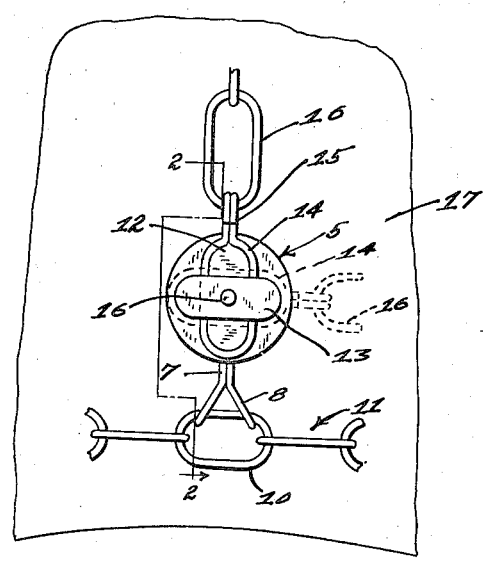
Figure 1 is a side elevation illustrating a fastener constructed in accordance with my invention and showing the application thereof to a fragmentary portion of a non-skid chain.
Figure 2:
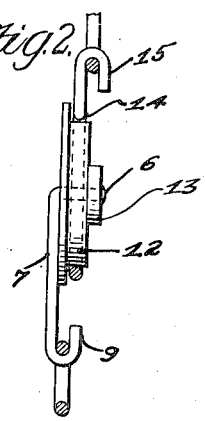
Figure 2 is a sectional view taken on the line 2—2 of Figure 1.
Figure 3:
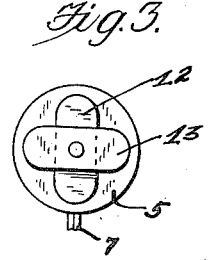
Figure 3 is a fragmentary side elevation illustrating a portion of the fastener with the connecting link removed.
Figure 4:
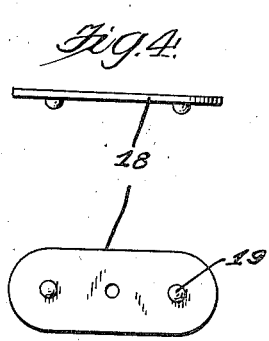
Figure 4 is an edge view illustrating a modified form of plate to be used in connection with the fastener.
Figure 5:
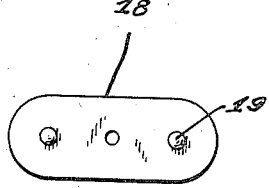
Figure 5 is a side elevation illustrating the modified form of plate.

Referring in detail to the drawing, the numeral 5 indicates a circular disc adapted to act as a guard or shield and is provided with a centrally arranged opening to receive a rightangularly disposed end 6 of a connecting link 7 which includes diverging portions 8 terminating in hooks 9 to engage with a link 10 of a side chain 11, a fragmentary portion of which is shown in Figure 1. The plate 5 is welded or otherwise secured on the rightangularly disposed end 6 of the link 7.

An elongated plate 12 is journaled on the end 6 of the link 7 and is arranged next to the shield plate 5. Fixed on the end 6 of the link 7 is an elongated retaining plate 13. The plates 12 and 13 have their ends rounded and each is of a shape to match with one another so that when the plate 12 is moved in parallelism with the plate 13 a link 14 may be placed onto the plate 12 and includes hooks 15 to be engaged with a cross chain 16 of a non-skid chain, a fragmentary portion of which is shown in Figure 1 and also illustrated as associated with a wall of the tire, the wall being indicated by the character 17.

When the non-skid chain is in use on a tire, the link 14 being in engagement with the end link of the cross chain positions the plate 12 at right angles to the plate 13 consequently preventing the link 14 from moving off of the fastener. However, should the cross chain 16 break it may fall and assume the dotted line position, as shown in Figure 1, under its own weight. When in the dotted line position the link 14 may then move off of the plate 12 and over the plate 13 and become disconnected from the non-skid chain. This will prevent the use of the non-skid chain with broken cross chains and obviate damage to fenders and other parts of the automobile.

Should it not be desired to detach the cross chain when broken from the non-skid chain, a plate 18 may be substituted for the plate 12 and is provided with projections 19. These projections will engage with the edge of the plate 13 when the cross chain 16 becomes broken and prevent the plate 18 from moving in parallelism with the plate 13. However, through a manual force on the plate 18 it may be caused to move in parallelism with the plate 13 so that the link 14 of the broken cross chain can be taken off.

Thus it will be seen from the foregoing description taken in connection with the accompanying drawing that a very efficient, practical and simple fastener has been provided for detachably connecting cross chains of a non-skid chain to the side chains thereof and which can be easily manipulated without the use of specially constructed tools and further may be arranged to release the broken cross chains from the non-skid chain when desired. Further, it is to be understood that the parts described in connection with this fastener may be manufactured at a very nominal cost and can be made of any material suitable for the purpose and of any size suitable for the type of non-skid chain it is to be employed on.

While I have shown and described the preferred embodiment of my invention, it will be understood that minor changes in construction, combination and arrangement of parts may be made without departing from the spirit and scope of the invention as claimed.

Having thus described the invention, what I claim is:

1. A fastener comprising a shield plate, a connecting link secured on said shield plate and projecting from one face thereof to form a journal, an elongated plate fixed on said journal, a second elongated plate rotatable on the journal and capable of moving into and out of parallelism with the first-named elongated plate, and a connecting link to engage with the second-named elongated plate.

2. A fastener comprising a link including hooks at one end and a rightangularly disposed extension at its other end, a shield plate mounted on said extension and fixed to the link, an elongated plate having rounded ends fixed to the end of the extension, a second elongated plate having rounded ends journaled on the extension and movable into and out of parallelism with the first-named elongated plate, and a link to engage with the second-named elongated plate and retained thereon by the first-named elongated plate when the second-named elongated plate is disposed at right angles to the first-named elongated plate, and hooks formed on the second-named link.

3. A fastener comprising a link including hooks at one end and a rightangularly disposed extension at its other end, a shield plate mounted on said extension and fixed to the link, an elongated plate having rounded ends fixed to the end of the extension, a second elongated plate having rounded ends journaled on the extension and movable into and out of parallelism with the first-named elongated plate, a link to engage with the second-named elongated plate and retained thereon by the first-named elongated plate when the second-named elongated plate is disposed at right angles to the first-named elongated plate, hooks formed on the second-named link, and projections formed on the second-named elongated plate to engage with edges of the first-named elongated plate to prevent the second-named elongated plate from moving in parallelism therewith until manually forced into said position.

HARLAN A. BANNER.